Figure 1:
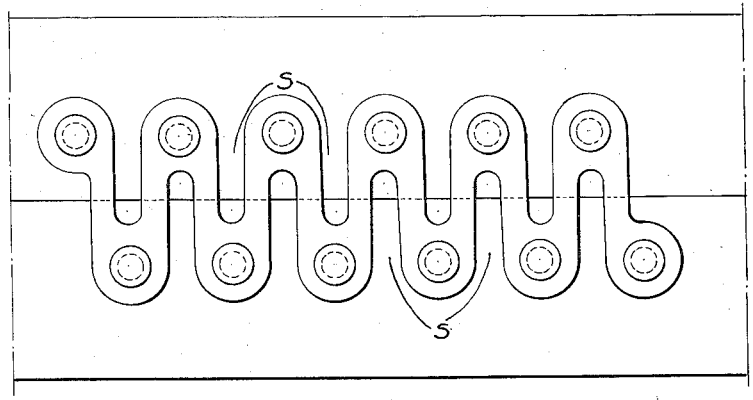

Feb. 4, 1936.  A. B. RALSON  2,029,635

FISHPLATE FOR LATERALLY JOINING TWO OR MORE METALLIC STRIPS

Filed March 23, 1934   2 Sheets-Sheet 1

Alfred Birdy Ralson
INVENTOR

By [signature]
his ATTY.

Feb. 4, 1936.  A. B. RALSON  2,029,635
FISHPLATE FOR LATERALLY JOINING TWO OR MORE METALLIC STRIPS
Filed March 23, 1934   2 Sheets-Sheet 2

Alfred Birdy Ralson
INVENTOR
his ATT'Y.

Patented Feb. 4, 1936

2,029,635

UNITED STATES PATENT OFFICE 2,029,635

FISHPLATE FOR LATERALLY JOINING TWO OR MORE METALLIC STRIPS

Alfred Birdy Ralson, Sandviken, Sweden

Application March 23, 1934, Serial No. 717,126
In Sweden April 8, 1933

5 Claims. (Cl. 24—31)

Rolled strips of steel or another metal are commonly used as the conveying medium both in belt conveyers and in devices for the continuous production or treatment of certain commodities, for example in baking ovens and drying stoves, in machines for making products in the shape of strips or sheets and the like, the requirements as regards the smoothness of the belt surface, which comes into contact with the material conveyed in many cases being severe. The manufacture of broad belts of steel or another metal rolled in one piece, however, is connected with such difficulties that it is desired to be able to make such belts of two or more strips lying side by side and firmly united with one another in such a way that a strong composite belt is obtained, which has no irregularities on one surface in which a large width of belt is necessary or desirable in connection with a smooth belt surface. When joining, to place the strips edge to edge and then to connect the edges with one another by means of butt welding, does not give a joint of a satisfactory character, inter alia for the reason that the strong local heating causes a continuous waviness along the whole welding seam. To unite the strips, which are placed edge to edge, with each other in a known way by means of a common fish-plate is not suitable, the longitudinal joint in a belt formed in such a way becoming stiffer against bending than the separate strips of which it consists, and therefore, when bending over end pulleys, break idlers and supporting rollers is subjected to greater stresses than these strips. The present invention relates to a fish-plate, by means of which, while maintaining a smooth belt surface, it is possible to join strips laterally in such a manner that such increased stresses in the strips do not arise during the working, or that these extra stresses in any case may be considerably reduced.

The invention is characterized in that the fish-plates are provided with slits of uniform width which extend about perpendicularly to the direction, which corresponds to the longitudinal direction of the belt, the slits being alternately open at one side and the other of the strip edges, which lie flush with each other with butted ends, so that on account of resilience in the legs, which surround the slits and are located about parallel to each other, the fish-plates do not make any appreciable resistance to the bendings of the belt. The fish-plates are secured to each of the joined strips at one or more points located in the ends of the legs and in the joining portion respectively between two adjacent legs.

Figure 3:
Figure 5:
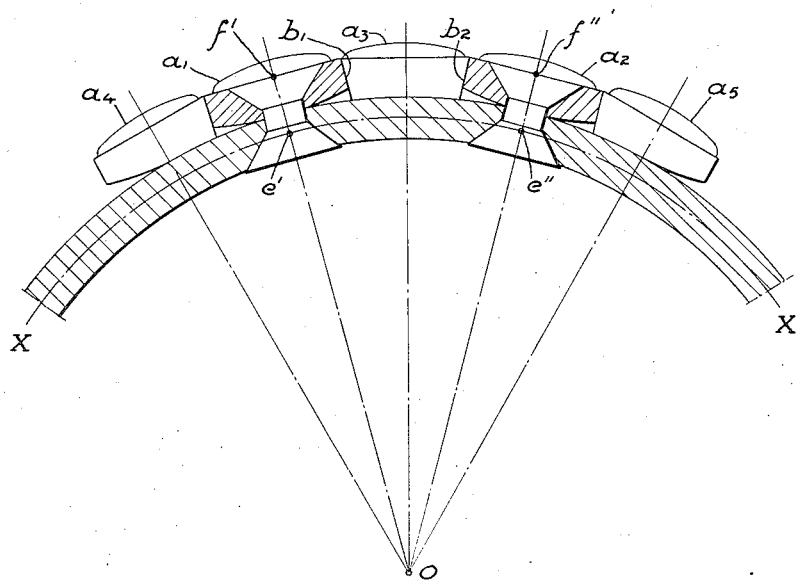
Figure 2:
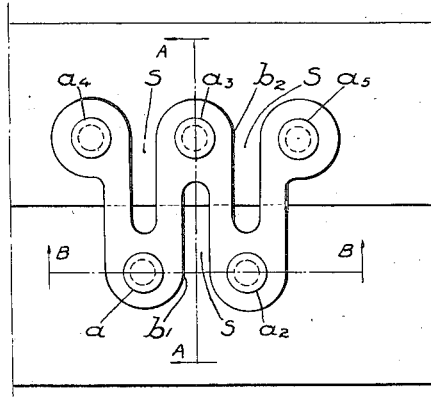
Figure 4:
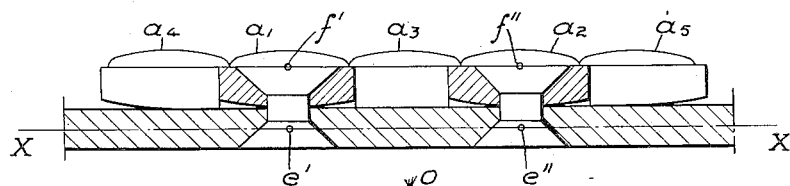
Figure 6:
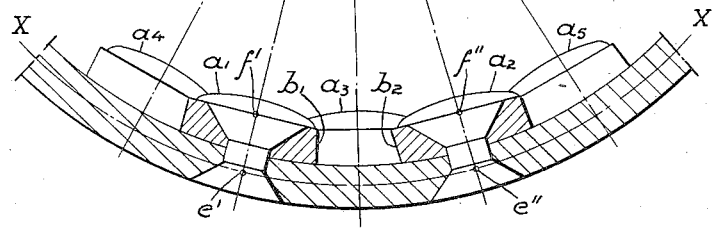

In the accompanying drawings Figures 1 and 2 show two different embodiments of the present invention, from which figures it will be seen that the number of the slits S in one and the same fish-plate may vary according to circumstances. According to the drawings the joining between the strips and the fish-plates is made by means of riveting. Sections along lines A—A and B—B of Figure 2 are shown in Figure 3 and Figure 4 respectively, and from the same it is clear, how the rivets are countersunk both in the fish-plate and in the strips respectively, the rivet heads, which are countersunk, being ground flush with the surface of the strips, by which the smooth belt surface, which is intended, is obtained. Figs. 5 and 6 correspond to Fig. 4 showing the belt bent in two directions around a roller or the like.

In the section shown in Figure 4 and taken along the line B—B of Fig. 2 the line X—X indicates the neutral axis of the belt, the length of the said axis remaining unchanged when the belt is being bent round drums or the like. The points of intersection between the line X—X and the longitudinal axes of the rivets $a_1$ and $a_2$, which are perpendicular thereto, are indicated by $e'$ and $e''$ respectively. Thus the length of the line $e'$—$e''$ is not changed, when the strip is being bent. The points $f'$ and $f''$ indicate the intersections of the surface of the fish-plate, which is turned away from the belt, with the longitudinal axes of the rivets $a_1$ and $a_2$ respectively. The line X—X being straight, as shown in Figure 4, the distance $f'$—$f''$ is equal to the distance $e'$—$e''$. Figure 5 also shows a section along the line B—B of Figure 2, but the belt is imagined to be bent along a circular line with the centre O, the fish-plate being on the outside of the belt. In such a case the longitudinal axes of the rivets $a_1$ and $a_2$ converge towards and intersect each other in the centre O. The ends of the legs $b_1$ and $b_2$, which are secured to the belt by means of the rivets $a_1$ and $a_2$ in such a case take up positions, which are tangential to the surface of the belt. The two other ends of these legs are, according to Figure 2, united with each other and secured to the belt by means of the rivet $a_3$, the prolonged longitudinal axis of which at the bending of the strip also passes through the point O, so that the joining piece between the legs $b_1$ and $b_2$, which is secured to the belt by means of the rivet $a_3$, also assumes a tangential position relatively to the surface of the belt.

As is clear from Figure 5 the length of the arc $f'$—$f''$ is larger than the distance $e'$—$e''$ and the ends of the legs $b_1$ and $b_2$, which are retained by the respective rivets $a_1$ and $a_2$ therefor have been moved away from each other and twisted, so that the legs $b_1$ and $b_2$ are subjected to simultaneous bending and twisting. On account of the open slit between the leg ends, which are secured to the belt by means of the rivets $a_1$ and $a_2$ the legs $b_1$ and $b_2$ are able to absorb by resilience the above mentioned bending and twisting without injurious reaction either on the strength of the fish-plate or on that of the belt.

Figure 6 shows a further section along line B—B of Figure 2, the belt being imagined to be bent along a circular line with the centre O but with the fish-plate located at the inside of the belt. The longitudinal axes of the rivets $a_1$ and $a_2$ intersect each other also in this case in the point O, but the distance $f'-f''$ in this case is shorter than the distance $e'-e''$, and the ends of the legs $b_1$ and $b_2$ thus have been moved nearer each other. The strains in the legs $b_1$ and $b_2$ also in this case become a combined bending and twisting like in the case illustrated in Figure 5.

The above described fish-plates may be used for joining two or more strips, and belts thus composed may be used for conveying purposes, baking, drying, cleansing, as a support for material, which is pressed between the belt and another device or the like, in which a large width of belt in connection with a smooth belt surface is desired. The fish-plates may be secured to the strips by means of riveting, spot welding or the like.

Having now described my invention, what I claim as new and desire to secure by Letters Patent is:

1. In combination, a fish plate, strips of metallic belting of the same thickness having their ends in alignment, means for securing said fish plate to only one flat side of the metallic belting, leaving the other flat side completely smooth, said fish-plate having slits extending from two opposite edges of the plate alternately in zigzag and all crossing a plane coinciding with the butted edges of the strips when joined, said fish-plate being adapted to travel along the above mentioned plane both in a straight and in a curved path, respectively, from one pulley to another and around pulleys.

2. In combination, a fish plate, strips of metallic belting of the same thickness having their ends in alignment, means for securing said fish plate to only one flat side of the metallic belting, leaving the other flat side completely smooth, said fish-plate having slits extending from two opposite edges of the plate alternately in zigzag and all crossing a plane coinciding with the butted edges of the strips when joined, the slits having parallel edges, and the legs between the slits running parallel to each other to reduce the bending stresses in the belt when the joining zone of the same changes its travel direction to pass around pulleys.

3. In combination, a fish plate, strips of metallic belting of the same thickness having their ends in alignment, means for securing said fish plate to only one flat side of the metallic belting, leaving the other flat side completely smooth, said fish-plate having slits extending from two opposite edges of the plate alternately in zigzag and all crossing a plane coinciding with the butted edges of the strips when joined, said fish-plate being provided with holes, connecting means therefor, comprising rivets, said holes being located in the material between the outer ends of the slits, the fish-plate being adapted to travel along the above mentioned plane both in a straight and in a curved path respectively, from one pulley to another and around pulleys.

4. In combination, a fish plate, strips of metallic belting of the same thickness having their ends in alignment, means for securing said fish plate to only one flat side of the metallic belting, leaving the other flat side completely smooth, said fish-plate having slits extending from two opposite edges of the plate alternately in zigzag and all crossing a plane coinciding with the butted edges of the strips when joined, said fish-plate being provided with holes, connecting means therefor, comprising rivets, said holes being located in the material between the outer ends of the slits, said slits having parallel edges and the legs between the slits running parallel to each other to reduce the bending stresses in the belt when the joining zone of the same changes its travel direction to pass around pulleys.

5. In combination, a fish-plate, strips of metallic belting of the same thickness united longitudinally edge to edge, means for securing said fish-plate to only one flat side of the metallic belting, leaving the other side completely smooth, said fish-plate having slits extending from two opposite edges of the plate alternately in zig-zag and all crossing a plane coinciding with the butted edges of the strips when united, said fish-plate being adapted to travel along the above mentioned plane both in a straight and in a curved path, respectively, from one pulley to another and around pulleys.

ALFRED B. RALSON.